United States Patent
Liang et al.

(10) Patent No.: US 12,144,036 B2
(45) Date of Patent: Nov. 12, 2024

(54) METHOD, DEVICE AND COMPUTER READABLE MEDIUM FOR PRACH SEQUENCE GENERATION

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 225 days.

(21) Appl. No.: 17/626,371

(22) PCT Filed: Jul. 12, 2019

(86) PCT No.: PCT/CN2019/095812
§ 371 (c)(1),
(2) Date: Jan. 11, 2022

(87) PCT Pub. No.: WO2021/007714
PCT Pub. Date: Jan. 21, 2021

(65) Prior Publication Data
US 2022/0264658 A1    Aug. 18, 2022

(51) Int. Cl.
| H04L 27/26 | (2006.01) |
| H04W 72/12 | (2023.01) |
| H04W 72/1263 | (2023.01) |
| H04W 74/08 | (2024.01) |
| H04W 74/0833 | (2024.01) |

(52) U.S. Cl.
CPC ..... *H04W 74/0841* (2013.01); *H04L 27/2607* (2013.01); *H04W 72/1263* (2013.01)

(58) Field of Classification Search
CPC ........ H04J 13/0062; H04J 13/14; H04J 13/22; H04L 27/2607; H04L 27/2613; H04W 72/1263; H04W 74/0841
See application file for complete search history.

(56) References Cited

U.S. PATENT DOCUMENTS

| 2009/0116459 A1 | 5/2009 | Do |
| 2012/0294253 A1 | 11/2012 | Yoon et al. |

FOREIGN PATENT DOCUMENTS

| EP | 1 971 097 A2 | 9/2008 |
| EP | 3509382 A1 | 7/2019 |
| JP | 2016-506705 A | 3/2016 |
| WO | 2008/129797 A1 | 10/2008 |

(Continued)

OTHER PUBLICATIONS

Extended European Search Report dated Jun. 27, 2022 in Application No. 19938084.1.

(Continued)

*Primary Examiner* — Melvin C Marcelo
*Assistant Examiner* — Natali Pascual Peguero
(74) *Attorney, Agent, or Firm* — Sughrue Mion, PLLC

(57) ABSTRACT

Embodiments of the present disclosure relate to method, device and computer readable medium for physical random access channel sequence generation. In example embodiments, a method includes determining an index of a cyclic shift for a root sequence. The method further includes determining a value of the cyclic shift based on a mapping between indices and cyclic shift values. The method further includes generating a random access preamble based on the root sequence and the value of the cyclic shift.

8 Claims, 5 Drawing Sheets

(56) References Cited

FOREIGN PATENT DOCUMENTS

WO         2017/204549 A1     11/2017
WO      WO-2021006688 A1 *   1/2021           H04J 13/0055

OTHER PUBLICATIONS

Huawei et al., "Initial access signal and channels in NR unlicensed band", 3GPP TSG RAN WG1 Meeting #97, Reno, USA, May 13-17, 2019, R1-1906041, 13 pages total.
Huawei, "Multiple values of cyclic shift increment N cs", TSG RAN WG1 Meeting #49, Kobe, Japan, May 7-11, 2007, R1-072325, 5 pages total.
International Search Report for PCT/CN2019/095812 dated Apr. 13, 2020 [PCT/ISA/210].
Written Opinion for PCT/CN2019/095812 dated Apr. 13, 2020 [PCT/ISA/237].
Japanese Office Action dated Jul. 4, 2023 in Japanese Application No. 2022-501376.
Kano et al., "Detection Algorithm for LTE Random Access in Doppler Environment", The Institute of Electronics, Information and Communication Engineers (IEICE), 2011, pp. 31-35 (5 pages total).

* cited by examiner

400 ↘

| length | 139 | 283 | | 571 | | 1151 | |
|---|---|---|---|---|---|---|---|
| index | Table 0 | Table 1-1 or 3-1 | Table 2-1 | Table 1-2 or 3-2 | Table 2-2 | Table 1-3 or 3-3 | Table 2-3 |
| 1 | 69 | 56 | 70 | 63 | 71 | 67 | 71 |
| 2 | 34 | 31 | 35 | 33 | 35 | 33 | 34 |
| 3 | 23 | 21 | 23 | 22 | 23 | 23 | 23 |
| 4 | 17 | 16 | 17 | 17 | 17 | 17 | 17 |
| 5 | 13 | 13 | 13 | 13 | 13 | 13 | 13 |
| 6 | 11 | 11 | 11 | 11 | 11 | 11 | 11 |
| 7 | 10 | 10 | 10 | 10 | 10 | 10 | 10 |
| 8 | 9 | 9 | 9 | 9 | 9 | 9 | 9 |
| 9 | 8 | 8 | 8 | 8 | 8 | 8 | 8 |
| 10 | 7 | 7 | 7 | 7 | 7 | 7 | 7 |
| 11 | 6 | 6 | 6 | 6 | 6 | 6 | 6 |
| 12 | 5 | 5 | 5 | 5 | 5 | 5 | 5 |
| 13 | 4 | 4 | 4 | 4 | 4 | 4 | 4 |
| 14 | 3 | 3 | 3 | 3 | 3 | 3 | 3 |
| 15 | 2 | 2 | 2 | 2 | 2 | 2 | 2 |

Fig. 4

METHOD, DEVICE AND COMPUTER READABLE MEDIUM FOR PRACH SEQUENCE GENERATION

CROSS REFERENCE TO RELATED APPLICATIONS

This application is a National Stage of International Application No. PCT/CN2019/095812 filed Jul. 12, 2019.

TECHNICAL FIELD

Embodiments of the present disclosure generally relate to the field of communication, and in particular, to method, device and computer readable medium for physical random access channel (PRACH) sequence generation.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP).

A random access (RA) procedure refers to a procedure for a terminal device to establish or reestablish a connection with a network device such as an Evolved NodeB (eNB) or a 5G gNodeB (gNB). During the RA procedure, the terminal device attempting to access the network device transmits a random access preamble to the network device. The transmitted random access preamble is selected from a set of sequences generated by cyclic shifting a root sequence(s).

SUMMARY

In general, example embodiments of the present disclosure provide method, device and computer readable medium for PRACH sequence generation.

In a first aspect, there is provided a method for communication. The method comprises determining an index of a cyclic shift for a root sequence. The method also comprises determining a value of the cyclic shift based on a mapping between indices and cyclic shift values. The method further comprises generating a random access preamble based on the root sequence and the value of the cyclic shift.

In a second aspect, there is provided a device for communication. The device includes a processor; and a memory coupled to the processing unit and storing instructions thereon, the instructions, when executed by the processing unit, causing the device to perform actions. The actions comprise determining an index of a cyclic shift for a root sequence. The actions also comprise determining a value of the cyclic shift based on a mapping between indices and cyclic shift values. The actions further comprise generating a random access preamble based on the root sequence and the value of the cyclic shift.

In a third aspect, there is provided a computer readable medium having instructions stored thereon, the instructions, when executed on at least one processor, causing the at least one processor to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4 shows a table illustrating comparison of example tables according to some embodiments of the present disclosure.

Throughout the drawings, the same or similar reference numerals represent the same or similar element.

DETAILED DESCRIPTION

Figure 1:
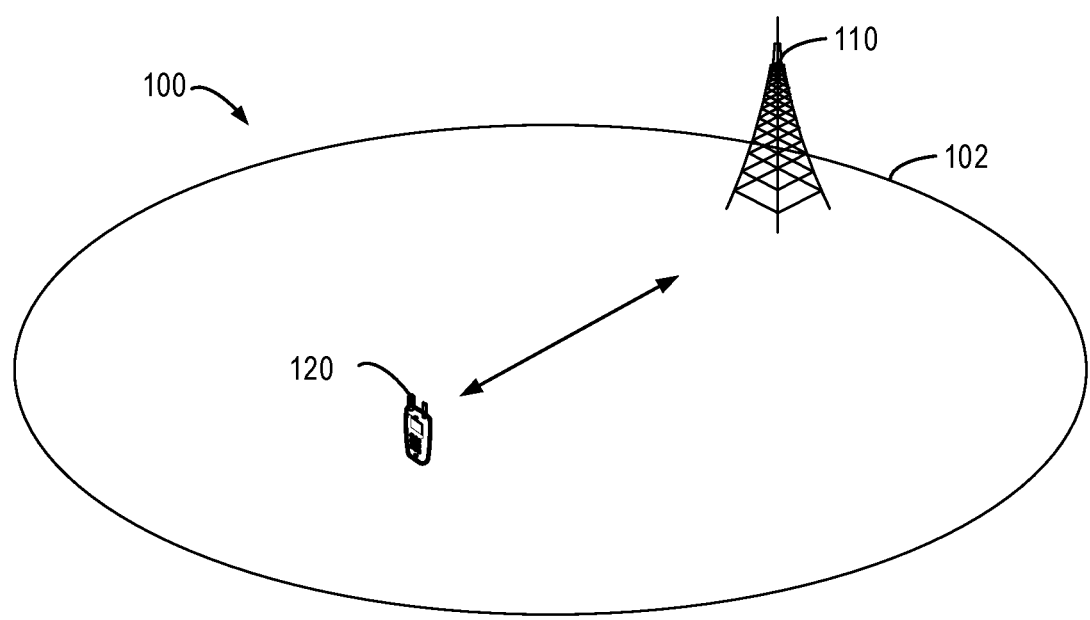
FIG. 1 is a schematic diagram of a communication environment in which some embodiments according to the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related to different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device.

FIG. 1 shows an example communication network 100 in which embodiments of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 120.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In the network 100, communications between the network device 110 and the terminal device 120 may be based on unlicensed band, and more particularly, based on unlicensed wide frequency bands. Although not shown, there may be other communication technologies in the communication network, for example, Wireless-Fidelity (Wi-Fi), which share the same unlicensed band. During RA procedure, the terminal device 120 may transmit a random access preamble to the network device 110.

As mentioned above, to transmit a random access preamble to the network device, a set of PRACH sequences needs to be generated based on one or more root sequences, such as Zadoff-Chu (ZC) sequence. Specifically, a cyclic shift operation is performed on a particular root sequence to obtain a PRACH sequence. Different cyclic shifts of one root sequence would result in different PRACH sequences. The window or step of a cyclic shift is defined as $N_{CS}$, which is referred to as a cyclic shift value $N_{CS}$ or a value of the cyclic shift herein. In order to generate the PRACH sequence, the cyclic shift value $N_{CS}$ required for the cyclic shift operation needs to be determined.

For PRACH on NR unlicensed (NR-U) band, the length of a PRACH sequence in frequency domain may increase due to for example compliance with Occupied Channel Bandwidth (OCB) regulation in European Telecommunications Standards Institute (ETSI), power control, etc. In addition to the legacy sequence with a length of 139, a new sequence with a larger length may be introduced.

For a subcarrier spacing of 15 kHz, the length $L_{RA}$ of the new sequence may be selected from 571 and 1151. For a subcarrier spacing of 30 kHz, the length $L_{RA}$ of the new sequence may be selected from 283 and 571. For purpose of discussion and without any limitation, the sequences with a length of 283, 571 and 1151 will be collectively referred to as "additional sequences" or individually referred to as an "additional sequence". Due to the inclusion of the additional sequences, issues regarding the generation of PRACH sequence with a new length need to be addressed.

According to an example embodiment, there is provided a solution for PRACH sequence generation to at least partially solve the above issues and other potential problems. In an example embodiment, an index of a cyclic shift for a root sequence is determined and a value of the cyclic shift is then determined based on a mapping between indices and cyclic shift values. Next, a random access preamble is generated based on the root sequence and the value of the cyclic shift.

Principle and example embodiments will now be described in detail below with reference to the accompanying drawings. However, those skilled in the art would readily appreciate that the detailed description given herein is for explanatory purpose as the present disclosure extends beyond theses limited embodiments.

Figure 2:
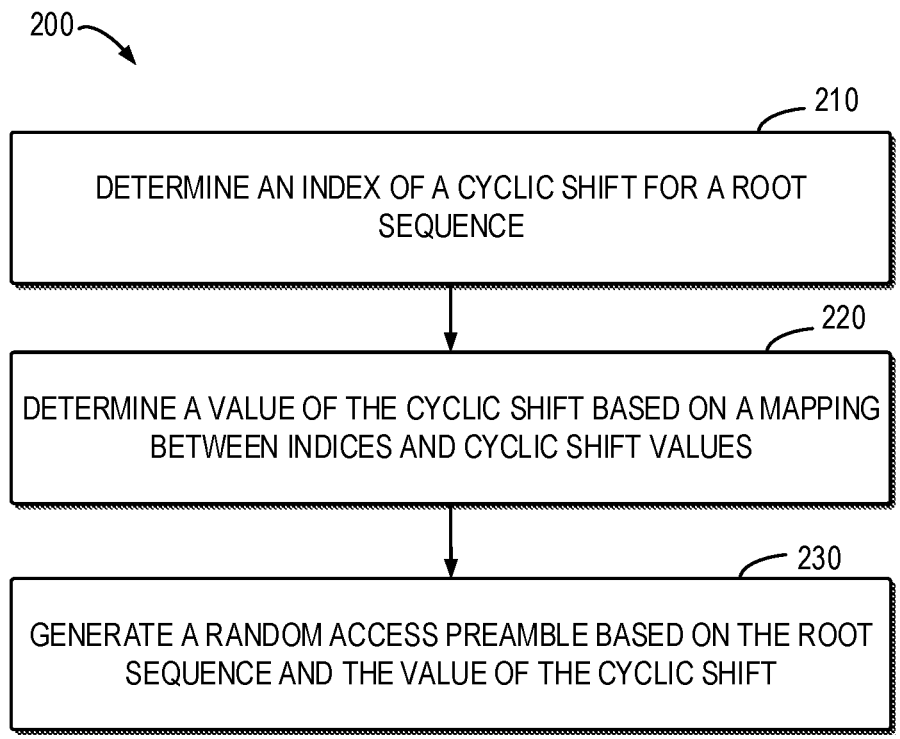
FIG. 2 illustrates a flowchart of an example method in accordance with some embodiments of the present disclosure.

FIG. 2 illustrates a flowchart of an example method 200 in accordance with some embodiments of the present disclosure. The method 200 can be implemented at the terminal device 120 shown in FIG. 1. It is to be understood that the method 200 may include additional blocks not shown and/or may omit some blocks as shown, and the scope of the present disclosure is not limited in this regard. For the purpose of discussion, the method 200 will be described with reference to FIG. 1.

At block 210, the terminal device 120 determines an index of a cyclic shift for a root sequence. The root sequence may be a ZC sequence for generating a PRACH sequence with a length of 283, 571, or 1151. For example, when generating a PRACH sequence with a length of 283, the terminal device 120 may first determine an index of the cyclic shift to be used for a ZC sequence with a length of 283.

In some example embodiments, the terminal device 120 may obtain an indication of the index from the network device 110 and the indication may comprise a plurality of bits, for example, 4 bits corresponding to 16 different indices. The terminal device 120 may determine the index of the cyclic shift based on a pattern of the plurality of bits. In such embodiments, the cyclic shift value $N_{CS}$ can be indicated to the terminal device 120 in relatively low overhead.

In some example embodiments, the indication of the index for the legacy sequence with a length of 139 can be reused for the additional sequence with a larger length of, for example, 283, 571 and 1151. The index of the cyclic shift value $N_{CS}$ for the legacy sequence may be indicated to the terminal device 120 via a Radio Resource Control (RRC) signaling in the field "zeroCorrelationZoneConfig". The terminal device 120 may determine the index of the cyclic shift for the additional sequence based on the field "zeroCorrelationZoneConfig". In such embodiments, by using a common indication with the legacy sequence, additional signaling overhead for the additional sequence can be avoided.

At block 220, the terminal device 120 determines a value of the cyclic shift based on a mapping between indices and cyclic shift values. For example, the terminal device 120 may determine the cyclic shift value $N_{CS}$ for the additional sequence with a length of for example, 283, 571, or 1151 by searching a predetermined table.

In some example embodiments, the mapping for the additional sequence may be determined based on a reference mapping between the indices and reference cyclic shift values. For example, the reference mapping may be represented by the table used for the legacy sequence with a length of 139. Such example embodiments will be described in detail below.

At block 230, the terminal device 120 generates a random access preamble based on the root sequence and the value of the cyclic shift. For example, the terminal device 120 may generate a PRACH sequence with a length of 283 (or 571, 1151) based on the determined cyclic shift value $N_{CS}$ and a ZC root sequence with a length of 283 (or 571, 1151). As such, a certain number (e.g. 64) of preambles can be generated by a set of cyclic shift operations on one or more ZC root sequences.

Now detailed description is made to the mapping between the indices and the cyclic shift values $N_{CS}$ for the additional sequences. The mapping for the additional sequences may be constructed based on a reference mapping for a reference sequence, for example, the legacy sequence with a length of 139.

Table 0 shows the mapping between the indices and the cyclic shift values $N_{CS}$ used for the legacy sequence with a length of 139. The index may be indicated by the field "zeroCorrelationZoneConfig". In the following description, Table 0 is taken as the reference mapping for constructing the mapping for the additional sequences.

TABLE 0

| $N_{CS}$ for the sequence with a length of 139 | |
| --- | --- |
| index | $N_{CS}$ value |
| 0 | 0 |
| 1 | 2 |
| 2 | 4 |
| 3 | 6 |
| 4 | 8 |
| 5 | 10 |
| 6 | 12 |
| 7 | 13 |
| 8 | 15 |
| 9 | 17 |
| 10 | 19 |
| 11 | 23 |
| 12 | 27 |
| 13 | 34 |
| 14 | 46 |
| 15 | 69 |

In the design and configuration of $N_{CS}$ values, the round trip delay of the cell should be taken into account. That is, each $N_{CS}$ value is associated with a cell size. In NR-U, the PRACH sequence with a length of 139 and the PRACH sequence with a new length (for example, 283, 571, and 1151) may be configured simultaneously. In other words, for a serving cell (e.g. the cell 120 shown in FIG. 1), two types of PRACH resources coexist, with one type of PRACH resource for the legacy sequence and the other for the additional sequence. In such a case, the cell sizes associated with $N_{CS}$ values for sequences with different lengths should be as similar as possible.

In some example embodiments, the $N_{CS}$ value for the additional sequence may be configured such that a cell size associated with the $N_{CS}$ value for the additional sequence is matched with (for example, the same as, or close to) a cell size associated with the $N_{CS}$ value for the legacy sequence.

A principle in determining the mapping is that the window duration in absolute time domain (which is also referred to as window duration herein) corresponding to the additional sequence is similar as that corresponding to the legacy sequence with a length of 139. Now reference is made to FIG. 3, which shows a schematic diagram 300 illustrating time domain configuration of a sequence 301 according to some embodiments of the present disclosure.

Figure 3:
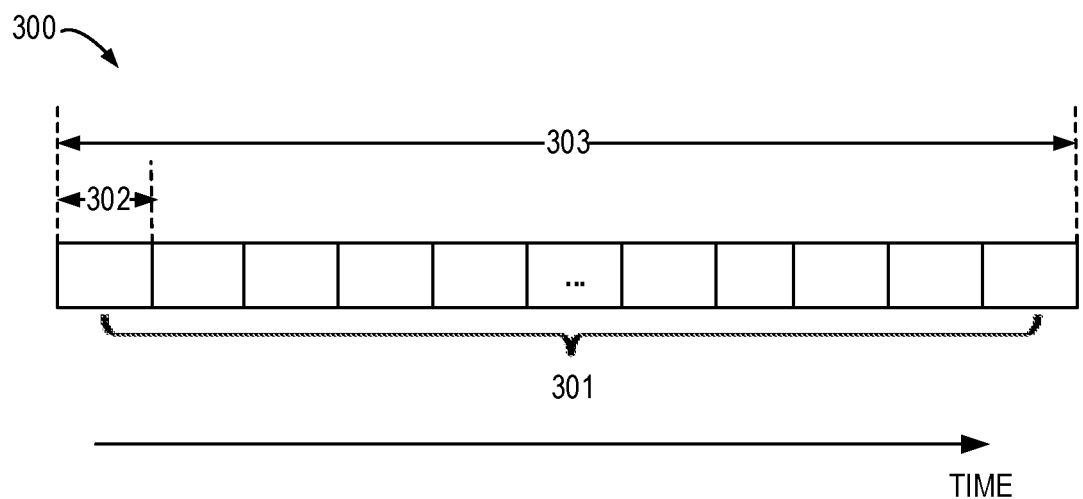
FIG. 3 shows a schematic diagram illustrating time domain configuration of a sequence according to some embodiments of the present disclosure.

The sequence 301 as shown in FIG. 3 may represent any of the legacy sequence with a length of 139 and the additional sequences with a length of 283, 571, 1151. Only for purpose of discussion, the window duration may be schematically represented as the ratio of the $N_{CS}$ window 302 to the sequence length 303. Larger window duration is associated with a larger cell size. In view of the above, the mapping for the additional sequences may be constructed based on the above Table 0 for the legacy sequence with a length of 139.

EXAMPLE 1

In this example, the mapping between the indices and the cyclic values $N_{CS}$ for the additional sequences may be determined based on the following equation:

$$Y1[i] = ceil\left(\frac{X[i]}{Lx*Ly}\right) \quad (1)$$

where X[i] represents the $N_{CS}$ value for index i as shown in the above Table 0; Y1[i] represents the $N_{CS}$ value for index i based on the mapping for the additional sequence; Lx represents the length of the reference sequence, which is 139 in this example; and Ly represents the length of the additional sequence, 283, 571 and 1151, respectively.

In this example, the mapping for the additional sequence with a length of 283 may be represented by the following Table 1-1.

TABLE 1-1

$N_{CS}$ for the sequence with a length of 283

| index | $N_{CS}$ value |
|---|---|
| 0 | 0 |
| 1 | 5 |
| 2 | 9 |
| 3 | 13 |
| 4 | 17 |
| 5 | 21 |
| 6 | 25 |
| 7 | 27 |
| 8 | 31 |
| 9 | 35 |
| 10 | 39 |
| 11 | 47 |
| 12 | 55 |
| 13 | 70 |
| 14 | 94 |
| 15 | 141 |

Likewise, the mapping for the additional sequence with a length of 571 may be represented by the following Table 1-2.

TABLE 1-2

$N_{CS}$ for the sequence with a length of 571

| index | $N_{CS}$ value |
|---|---|
| 0 | 0 |
| 1 | 9 |
| 2 | 17 |
| 3 | 25 |
| 4 | 33 |
| 5 | 42 |
| 6 | 50 |
| 7 | 54 |
| 8 | 62 |
| 9 | 70 |
| 10 | 79 |
| 11 | 95 |
| 12 | 111 |
| 13 | 140 |
| 14 | 189 |
| 15 | 284 |

Similarly, the mapping for the additional sequence with a length of 1151 may be represented by the following Table 1-3.

TABLE 1-3

$N_{CS}$ for the sequence with a length of 1151

| index | $N_{CS}$ value |
|---|---|
| 0 | 0 |
| 1 | 17 |
| 2 | 34 |
| 3 | 50 |
| 4 | 67 |
| 5 | 83 |
| 6 | 100 |
| 7 | 108 |
| 8 | 125 |
| 9 | 141 |
| 10 | 158 |
| 11 | 191 |
| 12 | 224 |
| 13 | 282 |
| 14 | 381 |
| 15 | 572 |

In any of these example tables, for the same index i, the window duration associated with a $N_{CS}$ value is larger than that associated with the corresponding $N_{CS}$ value in the Table 0. This means that the cell size associated with the $N_{CS}$ value for the additional sequence is larger than the cell size associated with the corresponding $N_{CS}$ value for the reference sequence, i.e. the legacy sequence with a length of 139 in this example.

As show in Table 0, for the index "8", the $N_{CS}$ value for the legacy sequence with a length of 139 is 15 and a schematic representation of the window duration is 15/139. In contrast, take Table 1-1 as an example. For the same index "8", the $N_{CS}$ value for the additional sequence with a length of 283 is 31 and a schematic representation of the window duration is 31/283, which is larger than 15/139.

EXAMPLE 2

In this example, the mapping between the indices and the cyclic shift values $N_{CS}$ for the additional sequences may be determined based on the following equation:

$$Y2[i] = floor\left(\frac{Ly}{floor(Lx/X[i])}\right) \quad (2)$$

where X[i] represents the $N_{CS}$ value for index i as shown in the above Table 0; Y2[i] represents the $N_{CS}$ value for index i based on the mapping for the additional sequence; Lx represents the length of the reference sequence, which is 139 in this example; and Ly represents the length of the additional sequence, 283, 571 and 1151, respectively.

As such, in this example, the mapping for the additional sequence with a length of 283 may be represented by the following Table 2-1.

TABLE 2-1

$N_{CS}$ for the sequence with a length of 283

| index | $N_{CS}$ value |
|---|---|
| 0 | 0 |
| 1 | 4 |
| 2 | 8 |
| 3 | 12 |
| 4 | 16 |
| 5 | 21 |

TABLE 2-1-continued

| index | $N_{CS}$ value |
|---|---|
| 6 | 25 |
| 7 | 28 |
| 8 | 31 |
| 9 | 35 |
| 10 | 40 |
| 11 | 47 |
| 12 | 56 |
| 13 | 70 |
| 14 | 94 |
| 15 | 141 |

$N_{CS}$ for the sequence with a length of 283

Likewise, the mapping for the additional sequence with a length of 571 may be represented by the following Table 2-2.

TABLE 2-2

$N_{CS}$ for the sequence with a length of 571

| index | $N_{CS}$ value |
|---|---|
| 0 | 0 |
| 1 | 8 |
| 2 | 16 |
| 3 | 24 |
| 4 | 33 |
| 5 | 43 |
| 6 | 51 |
| 7 | 57 |
| 8 | 63 |
| 9 | 71 |
| 10 | 81 |
| 11 | 95 |
| 12 | 114 |
| 13 | 142 |
| 14 | 190 |
| 15 | 285 |

Similarly, the mapping for the additional sequence with a length of 1151 may be represented by the following Table 2-3.

TABLE 2-3

$N_{CS}$ for the sequence with a length of 1151

| index | $N_{CS}$ value |
|---|---|
| 0 | 0 |
| 1 | 16 |
| 2 | 33 |
| 3 | 50 |
| 4 | 67 |
| 5 | 88 |
| 6 | 104 |
| 7 | 115 |
| 8 | 127 |
| 9 | 143 |
| 10 | 164 |
| 11 | 191 |
| 12 | 230 |
| 13 | 287 |
| 14 | 383 |
| 15 | 575 |

Only for purpose of discussion, the number of PRACH sequences that can be generated from one root sequence under a $N_{CS}$ value is referred to as window number associated with the $N_{CS}$ value. In any of Tables 2-1, 2-2 and 2-3, for the same index i, the window number associated with a $N_{CS}$ value is larger than or equal to that associated with the corresponding $N_{CS}$ value in the Table 0. This means that more PRACH sequences can be generated based on one root sequence.

As show in Table 0, for the index "9", the $N_{CS}$ value for the legacy sequence with a length of 139 is 17 and the window number associated with this $N_{CS}$ value of 17 is 8. In contrast, take Table 2-1 as an example. For the same index "9", the $N_{CS}$ value for the additional sequence with a length of 283 is 35 and the window number associated with this $N_{CS}$ value of 35 is also 8, the same as that for the legacy sequence.

For the index "2", the $N_{CS}$ value for the legacy sequence with a length of 139 is 4 and the window number associated with this $N_{CS}$ value of 4 is 34. In contrast, take Table 2-1 as an example again. For the same index "2", the $N_{CS}$ value for the additional sequence with a length of 283 is 8 and the window number associated with this $N_{CS}$ value of 8 is also 35, which is larger than that for the legacy sequence (34, in this example).

EXAMPLE 3

In this example, the mapping between the indices and the cyclic shift values $N_{CS}$ for the additional sequences may be determined based on the following equation:

$$Y3[i] = \text{floor}\left(\frac{Ly}{\text{floor}(Ly/Y1[i])}\right) \quad (3)$$

where Y1[i] represents the $N_{CS}$ value as shown in the equation (1); Y3[i] represents the $N_{CS}$ value for index i based on the mapping for the additional sequence; and Ly represents the length of the additional sequence, 283, 571 and 1151, respectively. It is to be noted that Y3[i] as shown in the equation (3) is equivalent to max(Y1[i], Y2[i]).

As such, in this example, the mapping for the additional sequence with a length of 283 may be represented by the following Table 3-1.

TABLE 3-1

$N_{CS}$ for the sequence with a length of 283

| index | $N_{CS}$ value |
|---|---|
| 0 | 0 |
| 1 | 5 |
| 2 | 9 |
| 3 | 13 |
| 4 | 17 |
| 5 | 21 |
| 6 | 25 |
| 7 | 28 |
| 8 | 31 |
| 9 | 35 |
| 10 | 40 |
| 11 | 47 |
| 12 | 56 |
| 13 | 70 |
| 14 | 94 |
| 15 | 141 |

Likewise, the mapping for the additional sequence with a length of 571 may be represented by the following Table 3-2.

TABLE 3-2

$N_{CS}$ for the sequence with a length of 571

| index | $N_{CS}$ value |
|---|---|
| 0 | 0 |
| 1 | 9 |
| 2 | 17 |
| 3 | 25 |
| 4 | 33 |
| 5 | 43 |
| 6 | 51 |
| 7 | 57 |
| 8 | 63 |
| 9 | 71 |
| 10 | 81 |
| 11 | 95 |
| 12 | 114 |
| 13 | 142 |
| 14 | 190 |
| 15 | 285 |

Similarly, the mapping for the additional sequence with a length of 1151 may be represented by the following Table 3-3.

TABLE 3-3

$N_{CS}$ for the sequence with a length of 1151

| index | $N_{CS}$ value |
|---|---|
| 0 | 0 |
| 1 | 17 |
| 2 | 34 |
| 3 | 50 |
| 4 | 67 |
| 5 | 88 |
| 6 | 104 |
| 7 | 115 |
| 8 | 127 |
| 9 | 143 |
| 10 | 164 |
| 11 | 191 |
| 12 | 230 |
| 13 | 287 |
| 14 | 383 |
| 15 | 575 |

For each of the indices, the window number associated with a $N_{CS}$ value in Table 3-1 is the same as that associated with the corresponding $N_{CS}$ value in Table 1-1, meanwhile the window duration associated with the $N_{CS}$ value in Table 3-1 is as large as possible. Likewise, for each of the indices, the window number associated with a $N_{CS}$ value in Table 3-2 is the same as that associated with the corresponding $N_{CS}$ value in Table 1-2, meanwhile the window duration associated with the $N_{CS}$ value in Table 3-2 is as large as possible. For each of the indices, the window number associated with a $N_{CS}$ value in Table 3-3 is the same as that associated with the corresponding $N_{CS}$ value in Table 1-3, meanwhile the window duration associated with the $N_{CS}$ value in Table 3-3 is as large as possible.

Several example tables have been given above. Reference is now made to FIG. 4, which shows a table 400 illustrating comparison of example tables according to some embodiments of the present disclosure. The number in each elements of table 400 denotes the window number associated with the $N_{CS}$ value in the corresponding example tables above. As an example, the number "56" in the element 401 means that in the case of the $N_{CS}$ value for index "1" as shown in Table 1-1 or Table 3-1, 56 PRACH sequences can be generated from one root sequence under the corresponding cyclic shift value.

There are 64 PRACH sequences in a cell. For a given $N_{CS}$ value, the number of root sequences required for generating the 64 PRACH sequences may be determined. For example, for the $N_{CS}$ value corresponding to the elements 401-404, the required number of root sequence is 2, 3, 4 and 2, respectively.

For indices "1", "2" and "3" in Table 0, i.e. in the case of the legacy sequence with a length of 139, the required number of root sequences for generating the 64 PRACH sequences is 1, 2, 3, respectively. In contrast, for indices "1", "2" and "3" in Table 1-1 or 3-1 (corresponding to the elements 401, 402 and 403), i.e. in the case of the additional sequence with a length of 283, the required number of root sequences for generating the 64 PRACH sequences is 2, 3, 4, respectively, each being more than the corresponding number for the legacy sequence. Similarly, for index "1" in Table 1-2 or 3-2 (corresponding to the elements 404), i.e. in the case of the additional sequence with a length of 571, the required number of root sequences for generating the 64 PRACH sequences is 2, which is larger than the corresponding number for the legacy sequence (1, in this case).

In such cases, the number of root sequences for generating the 64 PRACH sequences is different for the legacy sequence with a length of 139 and the additional sequence with a length of 283 or 571. As such, two root indices need to be separately indicated. It may be problematic if a common root index is indicated.

EXAMPLE 4

In order to solve the above potential problem, it is advantageous to combine the above Example 2 and 3. For the additional sequence with a length of 283, for indices "1", "2" and "3", the corresponding $N_{CS}$ values in Table 2-1 are used, meanwhile for the other indices, the corresponding $N_{CS}$ values in Table 3-1 are used. For the additional sequence with a length of 571, for the index "1", the corresponding $N_{CS}$ value in Table 2-2 is used, meanwhile for the other indices, the corresponding $N_{CS}$ values in Table 3-2 are used.

According to the above principle, new example tables may be constructed for the additional sequence with a length of 283 or 571. The mapping for the additional sequence with a length of 283 may be represented by the following Table 4-1.

TABLE 4-1

$N_{CS}$ for the sequence with a length of 283

| index | $N_{CS}$ value |
|---|---|
| 0 | 0 |
| 1 | 4 |
| 2 | 8 |
| 3 | 12 |
| 4 | 17 |
| 5 | 21 |
| 6 | 25 |
| 7 | 28 |
| 8 | 31 |
| 9 | 35 |
| 10 | 40 |
| 11 | 47 |
| 12 | 56 |
| 13 | 70 |
| 14 | 94 |
| 15 | 141 |

Likewise, the mapping for the additional sequence with a length of 571 may be represented by the following Table 4-2.

TABLE 4-2

$N_{CS}$ for the sequence with a length of 571

| index | $N_{CS}$ value |
|---|---|
| 0 | 0 |
| 1 | 8 |
| 2 | 17 |
| 3 | 25 |
| 4 | 33 |
| 5 | 43 |
| 6 | 51 |
| 7 | 57 |
| 8 | 63 |
| 9 | 71 |
| 10 | 81 |
| 11 | 95 |
| 12 | 114 |
| 13 | 142 |
| 14 | 190 |
| 15 | 285 |

MODIFICATIONS TO THE EXAMPLE TABLES

It is to be understood that the above tables, i.e. Table 1-1, 1-2, 1-3, 2-1, 2-2, 2-3, 3-1, 3-2, 3-3, 4-1 and 4-2, are given as examples without any limitation. Modifications may be made to the above example tables without departing from the scope of the present disclosure. For example, one or more $N_{CS}$ value may be changed, be reduced or increased. Just as an example, the $N_{CS}$ value corresponding to the index "2" for the additional sequence with a length of 571 may be "18" rather than "17" as exemplified in Table 3-2. As another example, a part of a table may be combined with a part of another table.

Some example embodiments are given below.

In some example embodiments, a length of the root sequence is 283, and the cyclic shift values comprise one or more of the following: 47, 56, 70, 94 and 141.

In some example embodiments, the cyclic shift values further comprise one or more of the following: 21, 25, 28, 31, 35 and 40.

In some example embodiments, the cyclic shift values further comprise one of a first set of values {4, 8, 12, 16}; a second set of values {5, 9, 13, 17}; or a third set of values {4, 8, 12, 17}.

In some example embodiments, a length of the root sequence is 571 and the cyclic shift values comprise one or more of the following: 95, 114, 142, 190 and 285.

In some example embodiments, the cyclic shift values further comprise one or more of the following: 33, 43, 51, 57, 63, 71 and 81.

In some example embodiments, the cyclic shift values further comprise one of a fourth set of values {8, 16, 24}; a fifth set of values {9, 17, 25}; or a sixth set of values {8, 17, 25}.

In some example embodiments, a length of the root sequence is 1151 and the cyclic shift values comprise one or more of the following: 191, 230, 287, 383 and 575.

In some example embodiments, the cyclic shift values further comprise one or more of the following: 50, 67, 88, 104, 115, 127, 143 and 164.

In some example embodiments, the cyclic shift values further comprise one of a seventh set of values {16, 33}; or an eighth set of values {17, 34}.

Mapping to Physical Resources

The preamble sequence with a length of 283, 571 and 1151 shall be mapped to physical resources. To map these sequences, baseband signal generation may be performed using the parameters shown in Table 5.

TABLE 5

Parameters for mapping to physical resources

| $L_{RA}$ | $\Delta f^{RA}$ for PRACH | $\Delta f$ for PUSCH | $N_{RB}^{RA}$ | $\bar{k}$ |
|---|---|---|---|---|
| 571 | 15 | 15 | 48 | 2 |
| 1151 | 15 | 15 | 96 | 0 |
| 283 | 30 | 30 | 24 | 2 |
| 571 | 30 | 30 | 48 | 2 | where $L_{RA}$ represents the length of PRACH sequence; $\Delta f^{RA}$ for PRACH represents the subcarrier spacing for PRACH; $\Delta f$ for PUSCH represents the subcarrier spacing for physical uplink shared channel (PUSCH); and $N_{RB}^{RA}$ represents allocation expressed in number of resource blocks (RBs) for PUSCH.

Figure 5:
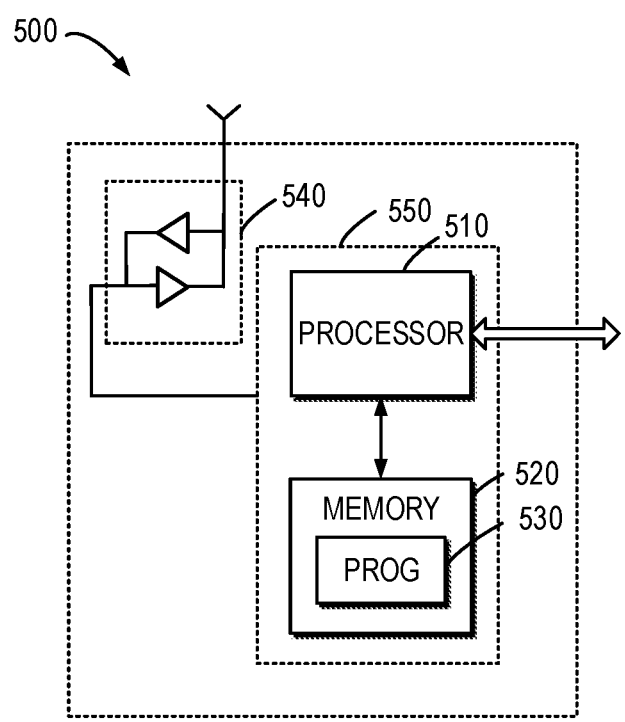
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as a further example implementation of the network device 110 or the terminal device 120 as shown in FIG. 1. Accordingly, the device 500 can be implemented at or as at least a part of the network device 110 or the terminal device 120.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the embodiments of the present disclosure, as discussed herein with reference to FIG. 2. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal comprising a processor configured to:
receive, from a network device, an indication of an index of a cyclic shift of a root sequence; and
generate a random access preamble based on the root sequence and a value of the cyclic shift, wherein
indices including the index are mapped to cyclic shift values including the value, and
the index corresponds to the value, wherein
a length of the root sequence is 571, $\Delta f^{RA}$ for a physical random access channel (PRACH) is 30, $\Delta f$ for an uplink shared channel (PUSCH) is 30, $N_{RB}^{RA}$ is 48 and $\bar{k}$ is 2.

2. The terminal according to claim 1, wherein the cyclic shift values include the following:
0, 8, 51, 63, 81, 114, 190, 285.

3. A network device comprising a processor configured to:
transmit, to a terminal, an indication of an index of a cyclic shift of a root sequence; and
receive, from the terminal, a random access preamble generated based on the root sequence and a value of the cyclic shift, wherein
indices including the index are mapped to cyclic shift values including the value, and
the index corresponds to the value, wherein
a length of the root sequence is 571, $\Delta f^{RA}$ for a physical random access channel (PRACH) is 30, $\Delta f$ for an uplink shared channel (PUSCH) is 30, $N_{RB}^{RA}$ is 48 and $\bar{k}$ is 2.

4. The network device according to claim 3, wherein the cyclic shift values include the following:
0, 8, 51, 63, 81, 114, 190, 285.

5. A method comprising:
receiving an indication of an index of a cyclic shift of a root sequence; and generating a random access preamble based on the root sequence and a value of the cyclic shift, wherein indices including the index are mapped to cyclic shift values including the value, and the index corresponds to the value, wherein a length of the root sequence is 571, $\Delta f^{RA}$ for a physical random access channel (PRACH) is 30, $\Delta f$ for an uplink shared channel (PUSCH) is 30, $N_{RB}^{RA}$ 48 and $\bar{k}$ is 2.

6. The method according to claim 5, wherein the cyclic shift values include the following:

0, 8, 51, 63, 81, 114, 190, 285.

7. A method comprising:

transmitting an indication of an index of a cyclic shift of a root sequence; and receiving a random access preamble generated based on the root sequence and a value of the cyclic shift, wherein indices including the index are mapped to cyclic shift values including the value, and the index corresponds to the value, wherein a length of the root sequence is 571, $\Delta f^{RA}$ for a physical random access channel (PRACH) is 30, $\Delta f$ for an uplink shared channel (PUSCH) is 30, $N_{RB}^{RA}$ is 48 and $\bar{k}$ is 2.

8. The method according to claim 7, wherein the cyclic shift values include the following:

0, 8, 51, 63, 81, 114, 190, 285.

\* \* \* \* \*